July 17, 1934. W. AMES 1,966,424
GAUGE
Filed Sept. 12, 1928
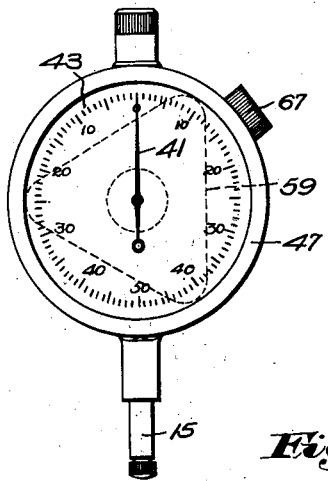
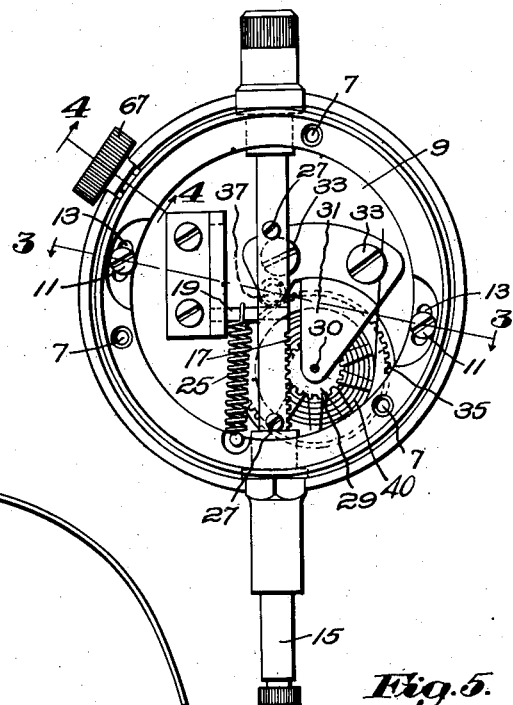
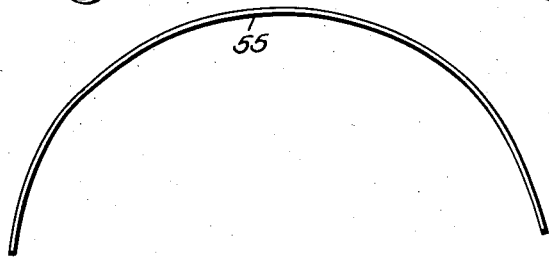
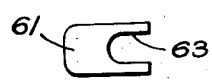
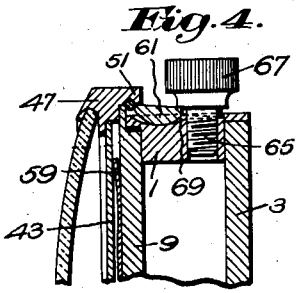
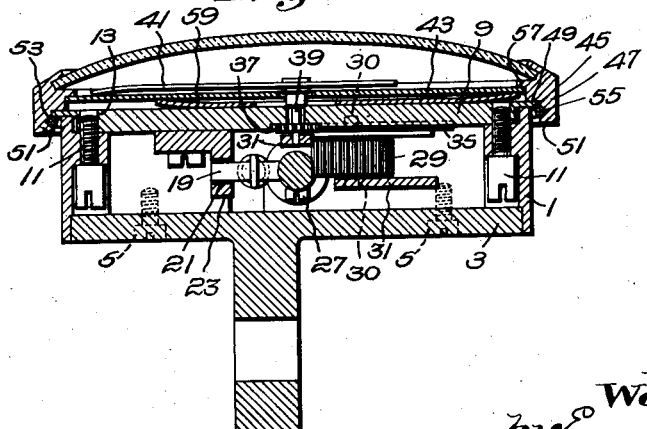
Inventor:
Warren Ames.

Patented July 17, 1934

1,966,424

UNITED STATES PATENT OFFICE 1,966,424

GAUGE

Warren Ames, Waltham, Mass.

Application September 12, 1928, Serial No. 305,354

7 Claims. (Cl. 33—172)

My invention relates to gauges, and particularly but not exclusively to indicating gauges for measuring small variations in work dimensions and for similar uses.

The invention will be best understood from the following description when read in the light of the accompanying drawing of one embodiment of the invention selected for illustrative purposes, while the scope of the invention will be more particularly pointed out in the appended claims.

In the drawing:—

Fig. 1 shows a front elevation of a gauge constructed according to the invention;

Fig. 2 is a rear view on an enlarged scale of the gauge constructed according to Fig. 1 with the back plate removed;

Figs. 3 and 4 respectively are sections on the lines 3—3 and 4—4 of Fig. 2;

Fig. 5 is a plan view of the bezel locking member according to Fig. 4; and

Fig. 6 illustrates the wire like spring member herein used for securing the bezel to the casing.

Referring to the drawing, the gauge illustrated comprises a casing 1 having a back plate 3 removably secured thereto by screws 5 threaded into the tapped holes 7 in the casing. At its opposite end the casing is shown as provided with a front plate 9 removably secured to the casing by screws 11, said screws extending through arcuate slots 13, concentric with the axis of the casing, and threaded into the tapped holes 13 in the front plate. In this manner, for a purpose which will hereinafter appear, the front plate is rotatably adjustable relative to the casing, the screws 11 which lock the front plate in its adjusted position being readily accessible when the back plate 3 is removed. Herein the casing 1 and back and front plates 3 and 9 constitute a support for the gauge mechanism.

As herein illustrated, the casing slidably supports a contact feeler 15 in the form of a rod which extends diametrically through the casing. As shown, the rod 15 is provided with rack teeth 17, and is prevented from rotation by a pin 19 rigidly secured thereto and sliding in a longitudinal groove 21 formed in a block 23 secured to the front plate 9. The contact feeler 15 is urged toward its position shown by the drawing by a spring 25 secured at one end to the pin 19 and at its other end to the casing, the limit of travel of the rod being determined by the two stop pins 27 carried thereby and cooperating with the inner wall of the casing.

As shown, meshing with the rack teeth 17 of the contact feeler is a pinion 29, the staff 30 of which at one end is journalled in a bracket 31 fixedly secured to the front plate 9 by screws 33, while the other end of the staff is journalled in the front plate. Herein, fixedly secured to the staff 30 of the pinion 29 is a gear 35 which meshes with a center pinion 37, the staff 39 of the latter being journalled in the bracket 31 and in the front plate 9. Conveniently, a torsion spring 40, coacting with the gear 35, is provided for taking up back-lash. This spring, as will be understood by those skilled in the art, is connected at one end to a fixed part of the casing and at its other end to the gear 35 so as to urge the latter to rotate in one direction. As shown, the staff 39 carries an indicator which herein is in the form of a needle 41 cooperating with a graduated dial 43, the latter in normal operation of the gauge being operatively fixed to the casing so that reciprocatory movement of the contact feeler relative to the casing will be indicated by movement of the needle relative to the dial.

It will be observed that the device so far described comprises a gear toothed member, exemplified by the contact feeler 15 provided with rack teeth 17, movable along a fixed path relative to a support exemplified by the casing 1, while the indicator, exemplified by the needle 41, and the motion transmitting means, exemplified by the train of gearing connecting the rack teeth to the needle, are carried by a part, exemplified by the front plate 9, adjustment of which relative to the casing is effective to move the indicator and motion transmitting means as a unit relative to the support so as to move the pinion cooperating with the gear toothed member more or less into mesh therewith. By this means proper meshing of the pinion and the gear toothed member, and compensation for wear of the teeth, may be effected without the necessity of the gear driving the indicator pinion, said gear exemplified by the gear 35 which meshes with the center pinion 37, moving with absolute accuracy about the axial line of the indicator pinion, thus avoiding the disadvantage of prior devices in which it has been attempted to obtain an adjustment between the rack teeth and rack pinion, or between similar parts.

As herein illustrated the front plate 9 is of greater diameter than the casing 1 and adjacent its periphery is of reduced diameter so as to provide a thin, radial flange 45 projecting from the casing. The bezel 47, as herein illustrated, is provided with a shoulder 49 rotatably engaging the flange 45, and it is further provided with an annular lateral flange 51 surrounding said flange 45 and projecting below it. As shown, the internal wall of the flange 51 is provided with an annular groove 53 into which is sprung a wire like spring member 55, the spring member being of such diameter that it may readily be entered into the space between the lateral flange 51 and the exterior wall of the casing, and preferably being of such length as to approximately entirely surround the casing. As shown the bezel is provided with an internal flange 57 providing a shoulder against which abuts the periphery of the dial 43, and between the dial and the front plate is a spring plate 59 which forces the dial against the shoulder, thus causing the dial to rotate with the bezel and the latter to be urged away from the casing to cause the spring 55 to bear against the under side of the flange 45.

The dial as above described may be rotated relative to the needle 41 by rotating the bezel, which rotation may be availed of to set the needle over a given dial graduation, as for example over the zero mark. For locking the bezel in its adjusted positions relative to the casing I have herein shown the casing as provided on its exterior with a member 61, (Figs. 4 and 5), one end of which enters the space between the casing and the flange 51 of the bezel. The opposite end of the member 61 is slotted as indicated at 63 so as to embrace the shank 65 of a screw threaded into the casing, the under side of the head 67 of the screw resting on the top surface of the member at opposite sides of the slotted portion thereof. As shown, the intermediate portion of the member 61 is curved at its under side and contacts with the bottom of a slot 69 in the exterior wall of the casing coextensive in width with the member 61. As will be obvious, the head of the screw 67 may be turned to rock the member 61 on its fulcrum, the latter afforded by the curved under surface of the member, to cause the end of the member opposite the screw to press against the inner side of the flange 51 of the bezel and lock the bezel in its adjusted positions relative to the casing.

It will be understood that the gauge herein described constitutes but one embodiment of my invention, and that wide deviations may be made from this embodiment without departing from the spirit of the invention.

I claim:

1. A gauge having, in combination, a hollow casing provided with a removable back plate and a rotatable front plate, the latter secured in adjusted position relative to said casing by means accessible when said back plate is removed, a movable indicator member operatively carried by said front plate, a rack mounted for reciprocation on said casing, a train of gearing for actuating said indicator member operatively carried by said front plate, said train of gearing comprising a pinion meshing with said rack.

2. A gauge having, in combination, a hollow casing having a rotatably adjustable front plate, an indicator comprising a normally stationary dial, means operatively supporting said dial on said casing in rotatable adjustable relation thereto, a pointer carried by said front plate cooperating with said dial, a rack mounted for reciprocation in a fixed path relative to said casing, a train of gearing operatively carried by said front plate for actuating said pointer, said train comprising a pinion meshing with said rack.

3. A gauge having, in combination, a support, a bezel rotatably mounted on said support, a dial rotatable with said bezel, said support having radially projecting means adjacent said bezel, the latter having a lateral annular flange surrounding said means, and a removable spring member carried by said annular flange cooperating with said radially projecting means for securing said bezel to said support.

4. A gauge comprising, in combination, a support, a bezel rotatably mounted on said support, a dial rotatable with said bezel, said support having a front plate providing an exteriorly projecting annular flange, said bezel having a lateral annular flange surrounding said projecting flange, a removable spring member carried by said lateral flange, said spring member cooperating with said projecting flange for securing said bezel to said support.

5. A gauge comprising, in combination, a support having a projecting annular flange at one end thereof, a bezel having a lateral flange surrounding said projecting flange, a spring member carried by said lateral flange and cooperating with said projecting flange for securing said bezel in rotatable relation to said support, a dial carried by said bezel, and spring means between said dial and support for holding said spring member against said projecting flange.

6. A gauge comprising, in combination, a support having a projecting annular flange at one end thereof, a bezel having a lateral flange surrounding said projecting flange, a spring member carried by said lateral flange and cooperating with said projecting flange for securing said bezel in rotatable relation to said support, a dial, said bezel having means providing a radial shoulder abutted by said dial, and spring means between said dial and support for holding said spring member against said projecting flange and for securing said dial to said bezel.

7. A gauge comprising, in combination, a support having a projecting annular flange at one end thereof, a bezel having a lateral flange surrounding said projecting flange, a spring member carried by said lateral flange and cooperating with said projecting flange for securing said bezel in rotatable relation to said support, and a spring means for urging said bezel away from said support for holding said spring member against said projecting flange.

WARREN AMES.